United States Patent [19]
Weber

[11] 3,802,222
[45] Apr. 9, 1974

[54] TORQUE-RESPONSIVE CLUTCH FOR HEDGE TRIMMERS AND THE LIKE
[75] Inventor: Edwin J. Weber, Baltimore, Md.
[73] Assignee: The Black and Decker Manufacturing Company, Towson, Md.
[22] Filed: Aug. 30, 1972
[21] Appl. No.: 284,963

[52] U.S. Cl.............. 64/30 E, 64/27 L, 64/15 B, 30/216, 64/29
[51] Int. Cl............................................. F16d 7/02
[58] Field of Search...... 64/30 E, 30 A, 30 C, 30 R, 64/27 L, 29, 15 B; 192/72, 56; 30/220, 216, 217

[56] References Cited
UNITED STATES PATENTS
2,664,626  1/1954  Jepson .......................... 30/216
1,896,025  1/1933  Griswold .......................... 64/29
2,255,742  9/1941  Schilling .......................... 64/30 A
1,165,772  12/1915  Garrand .......................... 64/30 E
1,861,088  5/1932  Hamel .......................... 64/30 R
2,360,488  10/1944  Garman .......................... 64/30 R FOREIGN PATENTS OR APPLICATIONS
836,577  6/1960  Great Britain .................... 64/30 R Primary Examiner—Samuel Scott
Assistant Examiner—Randall Heald

[57] ABSTRACT

A hedge trimmer including an electric motor and a reciprocating cutter blade assembly in which a pinion driven by the motor engages a spur gear drivingly connected through a slip clutch to the reciprocating cutter assembly. The slip clutch includes telescoped driving and driven members defining an annular recess in which is disposed leaf spring means bent by engagement with both members to impose a torque-releasable driving connection therebetween.

13 Claims, 5 Drawing Figures

PATENTED APR 9 1974 3,802,222

TORQUE-RESPONSIVE CLUTCH FOR HEDGE TRIMMERS AND THE LIKE

FIELD OF THE INVENTION

This invention relates generally to power operated devices, such as, for example, portable, hand-held hedge trimmers, and more particularly to an improved torque-responsive, rotary slip clutch for use in and in combination with devices of this type.

PRIOR ART

Hedge trimmers of the general character described herein and incorporating overload slip clutch means are known in the art. Many of these prior art devices embody a rotary clutch including circular spring elements interposed between the motor and blade assembly and sandwiched together under axial pressure. The clutch is designed to slip when the torque in the tool approaches a level where damage to the motor and/or drive train can occur.

In this construction, it is necessary that the axial pressure on the spring elements be carefully set during assembly of the tool, and that it periodically be checked and adjusted during tool use in order for the tool to perform in its intended manner. Thus, if the torque level at which the clutch slips is not accurately set and maintained, the clutch will either slip prematurely and render the tool ineffective, or the clutch will remain engaged at high torque levels and cause overload and possible damage to the motor and/or the transmission. The need, therefore, exists for a slip clutch in tools of the type referred to wherein the desired torque level setting is easily achieved at assembly and is maintained service free throughout use of the tool.

SUMMARY OF THE INVENTION

The present invention relates to an improved torque-responsive, slip clutch interposed between the driving part of a powered device, such as hedge trimmer, in which rotatable driving and driven members define a recess or cavity, and prerated leaf spring means is disposed in the cavity and automatically stressed between the members thereby forming a drive connection therebetween. The construction of the present invention does not require nor allow for any adjustment of the driving torque level. Furthermore, the clutch of the present invention is virtually unaffected by wear and thereby maintains a substantially constant torque level even after repeated usage. Thus, the invention insures proper and effective tool operation and prevents premature wear or failure of the tool motor and/or power train.

DESCRIPTION OF PREFERRED EMBODIMENTS

Figure 1:
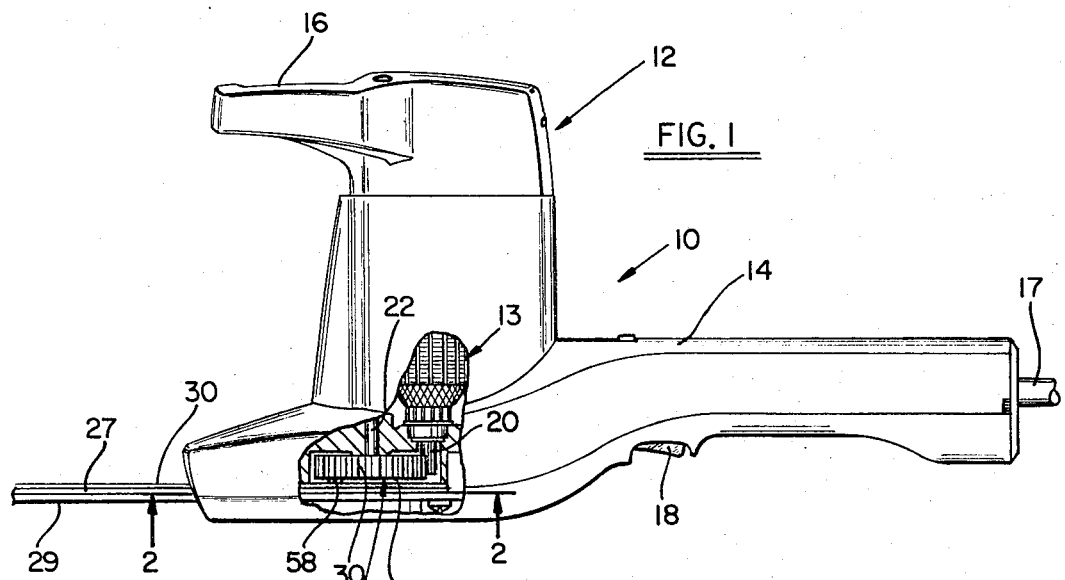
FIG. 1 is a side elevational view of a hedge trimmer incorporating the invention, a portion of the housing being broken away and a portion of the reciprocating cutter blade being removed.

Referring to the drawing in detail and first considering FIG. 1, a power-operated hedge trimmer is indicated generally at 10 and comprises a housing 12 having handles 14 and 16 integral therewith. A motor 13 is disposed within the housing 12 and is powered from a source connected thereto by a line cord 17. A control switch 18 on the handle 14 controls on-off operation of the tool 10. It will be appreciated that the motor 13 can be powered by battery means carried on or in the housing 12 in which case the line cord 17 would be dispensed with.

The motor 13 includes an output shaft having a pinion 20, formed thereon. The pinion 20 drivingly engages peripheral teeth 30 on a large spur gear 28 forming the driving member of a slip clutch 24 embodying the present invention. The clutch 24 includes a driven member 44 (FIGS. 2 and 3) having a crank pin 58 received in an elongated transverse slot (not shown) formed in a movable blade 27 A stationary blade 29 and a cover plate 30 sandwich and slidably support the movable blade 27, and each blade is provided with laterally extending teeth as is conventional, so that when the motor is energized, the blade 27 reciprocates and cooperates with blade 29 to trim shrubs, hedges, and the like.

Figures 2, 3:
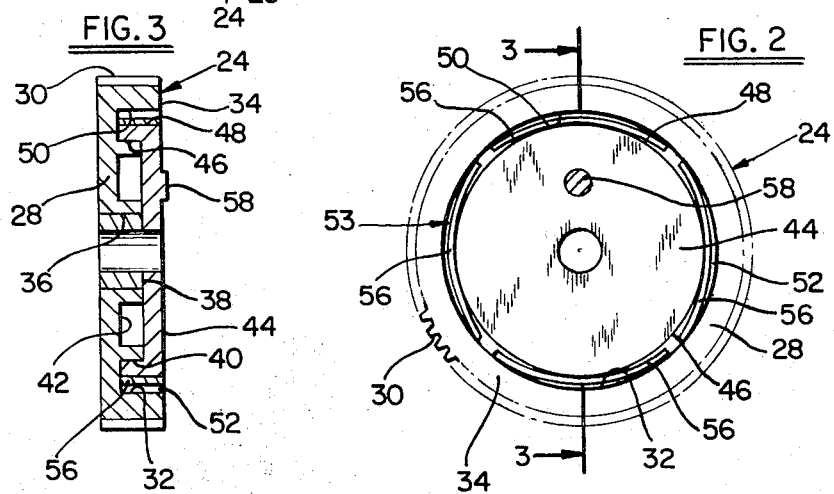
FIG 2 is an enlarged fragmentary section taken substantially on the plane of line 2—2 of FIG. 1, showing details of a preferred form of slip-clutch.
FIG. 3 is a sectional view taken substantially on the plane of line 3—3 of FIG. 2.

Turning now specifically to FIGS. 2 and 3, spur gear 28, forming the input or driving member of clutch 24, comprises a relatively thin flat body constructed of suitable material, such as powered metal, steel, or plastic, having the gear teeth 30 formed on its outer periphery and provided with an inner axial bore 36. A sleeve bearing 38 is pressed into the bore 36 and rotatably receives a shaft 22 supported at its other end in housing 12. The driven member 44 has a relatively thin annular flange 46 telescoped into an annular recess 48 and is slip fitted on an annular hub 40 of gear 28. A pluarlity of flat spring-like strips 56 are positioned in the recess 48 outwardly of the flange 46. The strips 56 are normally generally straight but are deflected when fitted into the recess 48 so as to bear against the flange 46 at an intermediate area, and against an annular surface 50 of gear 28 at their ends. The recess 48 may be packed with a suitable lubricant, for example, graphite.

It will be appreciated that the stressed spring strips 56 couple the driving and driven members 28, 44 of clutch 24 together with a force which is a function of the stress in the strips 56. Desirably, the spring strips 56 are stressed at least to, and preferably beyond the "yield point" for that material. The "yield point" is defined as a deflective force beyond which the material will not return to its original shape when the force is removed. When stressed beyond the yield point, the force of the spring strips 56 remains substantially constant and can be accurately predicted by careful selection of spring strip material and geometry, particularly its thickness. With this in mind, tolerances in the portions of gear 28 and member 44 defining the recess 48, and even in the length of strips 56, need not be carefully considered, since as long as the strips 56 are stressed beyond the yield point, the spring force in the clutch will be as predicated.

The spring force (F) developed by the strips 56 is represented by the formula:

$$F = \Delta E I / C L$$

where $\Delta$ is the deflection of the strips, E is the modulus of elasticity of the material, I is the bending moment of inertia of the material, C is a constant, and L is the length of the strips. The moment of inertia (I) is represented as follows: strips. The moment of inertia (I) is represented as follows:

$$I = BH^3/12$$

where $B$ is the width of the strips and H the thickness. As described above, the force (F) becomes a constant above the yield point of the spring material. Thus, this force can be accurately predicted and controlled by carefully selecting spring material having an appropriate modulus of elasticity (E) and controlling its thickness (H).

It has been found that the spring strips 56, when stressed as described, maintain a very stable spring force even with continuous or repeated clutch overload. This is distinguished from the various types of previously known overload clutches which required difficult and accurate setting at assembly and continuous monitoring and adjustment during use. With the construction of the present invention, the strips 56 are deflected above their yield point during assembly into the recess 48 and require no further adjustment even after long usage. Furthermore, the force developed in the spring strips 56 holds them in place in the recess 48 and the member 44 in place on the gear 28.

Figures 4, 5:
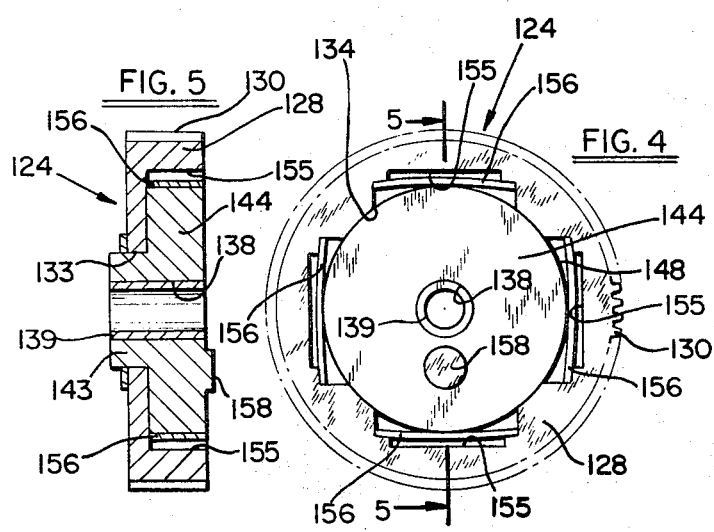
FIG. 4 is a view similar to FIG. 2, showing another embodiment of the slip-clutch.
FIG. 5 is a sectional view taken substantially on the plane of line 5—5 of FIG. 4.

Referring to FIGS. 4 and 5, a second embodiment of slip clutch is indicated generally at 124 and functions substantially in the same manner as the embodiment of FIGS. 1–3. In this embodiment the driving member of clutch 124 is a spur gear 128 driven by the motor pinion 20, or its equivalent, and has a cavity 134 formed therein. A driven member 144 is positioned in the cavity 134 and has a hub 143 slip fitted through a bore 133 in the gear 128 and an output crank pin 158. The gear 128 and member may be held together by a retaining ring 145. The driven member 144 has a central bore 138 in which a sleeve bearing 139 may be pressed.

As shown in FIG. 4, the cavity 134 is generally cylindrical in configuration with a plurality of, e.g., four, stepped recesses 155 extending radially outwardly thereof. A flat leaf-type spring 156 is positioned in each recess and is stressed (deflected) against the periphery of the member 144. As was the case in the embodiment of FIGS. 1–3, the spring 156 are deflected to or slightly beyond their yield point and exert a constant, predicatable, and accurate drag force on the member 144. Thus, the performance of clutch 124 is consistent and reliable in operation and requires no adjustment at set up or after use.

It will be appreciated that although the spring elements 56, 156 are shown as flat members, and that in both embodiments illustrate four substantially identical spring elements, different numbers and shapes of springs may be employed and that various other additions, substitutions, modifications, and omissions may be made within the spirit of the invention.

I claim:

1. In a power-operated hedge trimmer including a housing; a motor in said housing; a transmission driven by said motor and including pinion gear means; a cutter blade assembly mounted on said housing; and slip-clutch means operatively connected between said pinion gear means and said cutter blade assembly; the improvement in which said slip-clutch means comprises: a spur gear driving member including means for journaling the same about an axis of rotation, said driving member including an annular recess opening into one side thereof concentric to the axis of rotation; an annular driven member journaled for rotation in said annular recess of said driving member, said driving member and driven member defining an annular recess between confronting inner and outer peripheries, said annular driven member including power take-off means operatively connected to said cutter blade assembly; and torque-transmitting, slip clutch means including spring means positioned in said recess between the respective confronting peripheries of said driving member and said driven member, said recess and said spring means being so dimensioned that said spring means is stressed at or above the yield point for its material when positioned in said recess, whereby to develop a constant predicatable force between said driving and driven members, whereby torque over a predetermined value causes relative rotation between said driving member and driven member for protecting the operative components of the hedge trimmer.

2. The structure as claimed in claim 1 in which said torque-transmitting, slip clutch means comprises leaf-spring means.

3. The structure as claimed in claimed 2 in which said leaf spring means comprises at least one elongated flat element disposed in distorted relationship in the annular recess between said confronting peripheries and extends edgewise generally along and spaced from the axis of rotation of said members.

4. The structure as claimed in claim 2 in which said leaf spring means comprises a plurality of independent leaf springs each bowed independently and having alternate portions engaged between respective peripheries of said driving and driven members.

5. The structure as claimed in claim 5 in which the driving member includes spaced axially extending notch portions disposed outwardly of the inner periphery thereof and each receiving terminal ends of an independent leaf spring element therein.

6. The structure as claimed in claim 1 in which said driving member includes an annular hub co-axial with and extending into said annular recess, said driven member having an annular recess complimentary to and journaled on said annular hub.

7. A torque-responsive slip-clutch for use in a hedge trimmer or the like between a pinion gear and a cutter assembly comprising a spur gear driving member having an annular recess opening axially from one side thereof, a driven member having power take-off means, said driven member being journaled within the annular recess of said driving member and defining therewith an axial recess between confronting annular surfaces, and resilient torque-transmitting slip clutch means interposed between and engaging the confronting surfaces of said driving and driven members, said axial recess and said resilient clutch means being so dimensioned that when said resilient clutch means is positioned in said axial recess in engagement with said member confronting surfaces, said resilient clutch means is stressed at or above the yield point for its material, whereby said clutch means exerts a known constant predictable force between said driving and driven members permitting relative rotation between the driving and driven members when torque between the members exceeds a predetermined value.

8. A torque-responsive slip-clutch construction comprising rotatable driving and driven members located adjacent one another, said driving and driven members having confronting, generally annular surfaces and defining an annular cavity, means holding said driving and driven member adjacent one another and preventing movement of said adjacent surfaces away from one another, spring means located in said cavity and engaging said surfaces of said driving and driven members, said cavity and said spring means being so dimensioned that when said spring means is positioned in said cavity and engaging said member surfaces, said spring means is stressed at or above the yield point for the material thereof, where by to develop a constant, predicatable frictional force normally causing conjoint rotation of said driving and driven members.

9. The structure as claimed in claim 8 in which said slip clutch means comprises distorted leaf spring means having engaging portions of the confronting surfaces.

10. The structure as claimed in claim 9 in which said leaf spring means comprises an elongated section distorted along its longitudinal axis with alternate portions of the distorted section in engagement with the confronting surfaces.

11. A torque-responsive slip-clutch comprising rotatable driving and driven members supported for rotation about a common axis, said members being telescoped and defining an annular recess formed by spaced, opposed annular surfaces, elongated spring means located in said cavity and stressed to engage said annular surfaces at spaced locations therearound, said cavity being dimensioned and said spring means being constructed of a material and having a size and dimension such that when said spring means is interposed in said annular recess, said spring means is stressed at or above the yield point for the material thereof, whereby to develop a constant, predicatable frictional force between said driving and driven members.

12. A power-operated device comprising a motor having a rotatable output shaft, a power train interconnected with said shaft and driven therby, said power train including slip clutch means which comprises separable driving and driven members having spaced confronting surfaces defining recess means there-between, spring means located in said recess means to transmit torque from said driving to said driven member, said recess means being dimensioned and said spring means being constructed of a material and sized so that when said spring means is in position in said recess means, said spring means is stressed at or above the yield point for the material thereof.

13. A device as defined in claim 12 wherein said spring means includes a plurality of elongated, relatively thin spring elements symmetrically disposed about the axis of rotation of said slip clutch members.

* * * * *

UNITED STATES PATENT OFFICE
CERTIFICATE OF CORRECTION

Patent No. 3,802,222　　　　　　　　Dated April 9, 1974

Inventor(s) Edwin Joseph Weber

It is certified that error appears in the above-identified patent and that said Letters Patent are hereby corrected as shown below:

Column 2, line 24, after "27" insert a --.--;
　　　　　　line 34, "powered" should be --powdered--;
　　　　　　line 41, "pluarlity" should be --plurality--;
　　　　　　line 66, "predicated" should be --predicted--.

Column 3, lines 7 and 8, remove all words after "follows:" in line 7;
　　　　　　line 50, "spring" should be --springs--;
　　　　　　lines 51 and 52, "predicatable" should be --predictable--.

Column 4, line 20, "predicatable" should be --predictable--;
　　　　　　line 39, second occurrence, the numeral "5" should be --4--

Column 5, line 8, "member" should be --members--;
　　　　　　line 16, "where by" should be --whereby--;
　　　　　　line 16, "predicatable" should be --predictable--;
　　　　　　line 19, the numeral "8" should be --7--.

Column 6, line 10, "predicatable" should be --predictable--;
　　　　　　line 14, "therby" should be --thereby--.

Signed and Sealed this

Twenty-seventh Day of July 1976

[SEAL]

Attest:

RUTH C. MASON　　　　　　　　C. MARSHALL DANN
*Attesting Officer*　　　　　*Commissioner of Patents and Trademarks*